United States Patent [19]
Nagata et al.

[11] 4,271,075
[45] Jun. 2, 1981

[54] PROCESS FOR PRODUCING 3,3-BIS-(4-DIMETHYLAMINOPHENYL)-6-DIMETHYLAMINOPHTHALIDE

[75] Inventors: Mitsuru Nagata; Kazuyuki Wakasugi, both of Yokohama, Japan

[73] Assignee: Hodogaya Chemical Co., Ltd., Tokyo, Japan

[21] Appl. No.: 116,383

[22] Filed: Jan. 29, 1980

[30] Foreign Application Priority Data

Feb. 14, 1979 [JP] Japan ................................. 54-15002

[51] Int. Cl.$^3$ .......................................... C07D 307/88
[52] U.S. Cl. ................................................ 260/343.4
[58] Field of Search ..................................... 260/343.4

[56] References Cited
U.S. PATENT DOCUMENTS 3,987,062  10/1976  Okada et al. ..................... 260/343.4
4,052,415  10/1977  Mayer .............................. 260/343.4

FOREIGN PATENT DOCUMENTS 1347467  2/1974  United Kingdom ................. 260/343.4
1395627  5/1975  United Kingdom ................. 260/343.4

Primary Examiner—Henry R. Jiles
Assistant Examiner—Jane T. Fan
Attorney, Agent, or Firm—Oblon, Fisher, Spivak, McClelland & Maier

[57] ABSTRACT 3,3-Bis-(4-dimethylaminophenyl)-6-dimethylaminophthalide is produced by oxidizing an alkali metal salt of 2-[4,4'-bis-(dimethylamino)-benzhydryl]-5-dimethylaminobenzoic acid in an aqueous solution of pH of 8 to 14 with hydrogen peroxide, oxygen or air in the presence of a catalyst selected from the group consisting of cobalt compounds and copper compounds.

5 Claims, No Drawings

PROCESS FOR PRODUCING 3,3-BIS-(4-DIMETHYLAMINOPHENYL)-6-DIMETHYLAMINOPHTHALIDE

BACKGROUND OF THE INVENTION

1. Field of the Invention

The present invention relates to an improved process for producing 3,3-bis-(4-dimethylaminophenyl)-6-dimethylaminophthalide which is known as Crystal Violet Lactone.

2. Description of the Prior Arts

Crystal Violet Lactone has been widely used as coloring agent for a pressure sensitive copying paper (carbonless copying paper). Various processes for producing Crystal Violet Lactone have been proposed. For example, it has been proposed to produce Crystal Violet Lactone by treating 2-[4,4'-bis-(dimethylamino)-benzhydryl]-5-dimethylaminobenzoic acid which is called as Crystal Violet Lactone Leuko base with an oxidizing agent such as lead peroxide, potassium permanganate in an aqueous solution of a mineral acid. In accordance with this process, a large amount of black tar by-products is produced to cause a low yield of Crystal Violet Lactone and a low quality of the product of Crystal Violet Lactone.

It has been also proposed to produce Crystal Violet Lactone by oxidizing Crystal Violet Lactone Leuko base suspended in a mixed medium of a water immiscible hydrocarbon type solvent and water with hydrogen peroxide in the presence of an acid catalyst in Japanese Unexamined Patent Publication No. 78867/1977. This process has a disadvantage of difficulty of the post-treatment such as a recovery of the solvent.

It has been proposed to produce Crystal Violet Lactone by adding an aqueous solution of hydrogen peroxide to an alkaline aqueous solution of Crystal Violet Lactone Leuko base at high temperature in British Pat. No. 1,347,467. This process has a disadvantage of relatively low yield because a large amount of by-product is formed and the unreacted Crystal Violet Lactone Leuko base is remained.

It has been also proposed to produce Crystal Violet Lactone by adding a water miscible organic solvent to an alkaline aqueous solution of Crystal Violet Lactone Leuko base and oxidizing it with an oxidizing agent in U.S. Pat. No. 4,076,728. This process has a disadvantage of a difficulty of a recovery of the solvent and a low yield.

It has been proposed to produce Crystal Violet Lactone by oxidizing Crystal Violet Lactone Leuko base with oxygen in an acidic condition in an organic solvent such as glacial acetic acid or chloroform with chloranil in the presence of a metal complex catalyst in British Pat. No. 1,395,627. This process has a disadvantage of the use of chloranil and the special organic solvent and a production of a large amount of by-products.

SUMMARY OF THE INVENTION

It is an object of the present invention to provide a process for producing 3,3-bis-(4-dimethylaminophenyl)-6-dimethylaminophthalide having high quality by a quantitative reaction without disadvantages of a formation of a large amount of decomposed by-products, a remaining of the unreacted 2-[4,4'-bis-(dimethylamino)-benzhydryl]-5-dimethylaminobenzoic acid or a difficulty of the post-treatment.

The foregoing and other objects of the present invention have been attained by providing an improved process for producing 3,3-bis-(4-dimethylaminophenyl)-6-dimethylaminophthalide which comprises oxidizing an alkali metal salt of 2-[4,4'-bis-(dimethylamino)-benzhydryl]-5-dimethylaminobenzoic acid in an aqueous solution at pH of 8 to 14 with hydrogen peroxide, oxygen or air in the presence of a catalyst selected from the group consisting of cobalt compounds and copper compounds.

DETAILED DESCRIPTION OF THE PREFERRED EMBODIMENTS

The basical feature of the present invention is to oxidize an alkali metal salt of 2-[4,4'-bis-(dimethylamino)-benzhydryl]-5-dimethylaminobenzoic acid in an aqueous solution at pH of 8 to 14 with hydrogen peroxide, oxygen or air and the characteristic feature is to oxide it in said condition in the presence of the catalyst selected from the group consisting of cobalt compounds and copper compound.

Suitable metal compounds used as the catalyst in the improved process of the present invention include copper compounds such as cupric acetate, cupric chloride, cupric sulfate, and copper phthalocyanine; and cobalt compounds such as cobalt chloride, cobalt acetate, cobalt carbonate, cobalt oxide, cobalt naphthenate and alkaline aqueous solution soluble type cobalt complexes.

The alkaline aqueous solution soluble type cobalt complexes having sulfonic acid group, carboxylic acid group or hydroxyl group have excellent catalytic effect even though only small amount of the complex is added. Moreover, the catalyst can be easily separated, after the oxidation, by filtering the precipitate and washing it with water so as to obtain 3,3-bis-(4-dimethylaminophenyl)-6-dimethylaminophthalide having high quality.

Suitable cobalt complexes include cobalt complexes of
1-[(2-hydroxynaphthyl)azo]-2-hydroxybenzene-5-sulfonic acid [I];
1-[(2-hydroxy-5-nitrophenyl)azo]-2-hydroxynaphthalene-3,6-disulfonic acid [II];
1-[(1-phenyl-3-methyl-5-pyrazolone-4-yl)azo]-2-hydroxynaphthalene-4-sulfonic acid [III];
1-[(1-phenyl-3-methyl-5-pyrazolone-4-yl)azo]-2-hydroxynaphthalene-4-carboxylic acid [IV];
2-hydroxy-3-[(N-phenyl-3-oxobutanamide-2-yl)azo]-5-nitro benzene sulfonic acid [V];
1,2-bis-(2-hydroxy-sulfobenzylidenamino)-benzene [VI];
1,2-bis-(2-hydroxy-sulfobenzylidenamino)-ethane [VII];
phenyl alanin sulfonic acid [VIII];
benzoylacetone sulfonic acid [IX];
benzoyl-tri-fluoroacetone sulfonic acid [X];
1-formyl-2-hydroxybenzene sulfonic acid [XI];
1-amino-2-hydroxybenzene sulfonic acid [XII]; or salt thereof.

The cobalt complexes can be 1:1 type or 2:1 type cobalt complexes of said component and the salts are preferably potassium sodium or ammonium salts thereof.

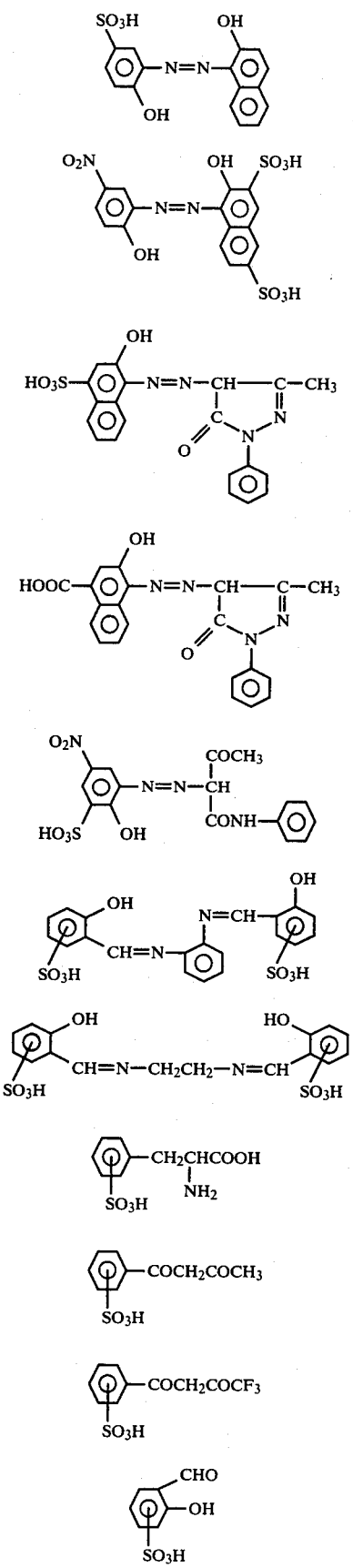

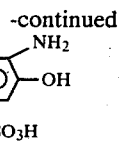

An amount of the catalyst is usually in a range of 0.001 wt.% to 5 wt.% preferably 0.01 wt.% to 2 wt.% based on the starting material. When the alkaline aqueous solution soluble type cobalt complex is used as the catalyst, an amount of the catalyst is usually in a range of 0.001 wt.% to 1 wt.% especially 0.01 wt.% to 0.5 wt.% based on the starting material.

A concentration of an alkali metal salt of 2-[4,4'-bis-(dimethylamino)-benzhydryl]-5-dimethylaminobenzoic acid in an aqueous solution is usually in a range of 0.1 wt.% to 50 wt.% preferably 1 wt.% to 40 wt.%. The alkali metal salt is usually sodium or potassium salt depending upon the base used for adjusting pH to 8 to 14.

In the process of the present invention, hydrogen peroxide, oxygen or air is used as the oxidizing agent. When hydrogen peroxide is used, the alkaline aqueous solution of an alkali metal salt of 2-[4,4'-bis-(dimethylamino)-benzhydryl]-5-dimethylaminobenzoic acid containing the catalyst is heated at a desired temperature and an aqueous solution of hydrogen peroxide is added dropwise to react them. When oxygen or air is used, oxygen or air is fed into the aqueous solution under the atmospheric pressure or higher pressure to react them.

An amount of the oxidizing agent as an effective amount is usually at an equivalent of 1 to 1.5 based on an alkali metal salt of 2-[4,4'-bis-(dimethylamino)-benzhydryl]-5-dimethylaminobenzoic acid.

The reaction temperature is preferably in a range of 40° to 100° C.

The present invention will be illustrated by certain examples which are provided for purposes of illustration only and are not intended to be limiting the present invention.

EXAMPLE 1

To 1,500 wt. parts of an aqueous solution containing 21.2 wt. parts of sodium carbonate was added 41.7 wt. parts of 2-[4,4'-bis-(dimethylamino)-benzhydryl]-5-dimethylaminobenzoic acid and 0.03 wt. part of cobalt complex of 1-[(2-hydroxynaphthyl)azo]-2-hydroxybenzene-5-sulfonic acid as a catalyst and it was dissolved at an elevated temperature. The solution was heated at 80° C. and 51 wt. parts of 10% hydrogen peroxide aqueous solution was added dropwise during 1 hour (pH=9.6). The precipitated product was separated by a filtration and the resulting cake was washed with a dilute aqueous solution of sodium hydroxide and with water to obtain 41.1 wt. parts of 3,3-bis-(4-dimethylaminophenyl)-6-dimethylaminophthalide having a melting point of 181° to 183° C.

As a reference, the same process was repeated except that the cobalt complex was not added. As a result, only 16.6 wt. parts of 3,3-bis-(4-dimethylaminophenyl)-6-dimethylaminophthalide was obtained.

EXAMPLE 2

In accordance with the process of Example 1 except using 0.03 wt. part of cobalt complex of 1-[(1-phenyl-3-methyl-5-pyrazolone-4-yl)azo]-2-hydroxynaphthalene- 4-sulfonic acid as a catalyst, the oxidation and the post-treatment were carried out. As a result, 40.7 wt. parts of 3,3-bis-(4-dimethylaminophenyl)-6-dimethylaminophthalide having a melting point of 180° to 183° C. was obtained.

EXAMPLE 3

In accordance with the process of Example 1, the aqueous solution containing sodium carbonate and 2-[4,4'-bis-(dimethylamino)-benzhydryl]-5-dimethylaminobenzoic acid and cobalt complex of 1-[(2-hydroxynaphthyl)azo]-2-hydroxybenzene-5-sulfonic acid, was heated at 90° C. and 1.6 wt. parts of oxygen was fed into it under the atmospheric pressure during 5 hours, and the precipitate was separated by a filtration and washed with a dilute aqueous solution of sodium hydroxide and with water to obtain 40.7 wt. parts of 3,3-bis-(4-dimethylaminophenyl)-6-dimethylaminophthalide having a melting point of 181° to 183° C.

EXAMPLE 4

To 1,500 wt. parts of an aqueous solution containing 41.7 wt. parts of 2-[4,4'-bis-(dimethylamino)-benzhydryl]-5-dimethylaminobenzoic acid and 4.4 wt. parts of sodium hydroxide was added 0.4 wt. part of cobaltous chloride. The mixture was heated at 70° C. and 51 wt. parts of 10% aqueous solution of hydrogen peroxide was added dropwise during 1 hour (pH=9.9). The precipitate was separated and dissolved into toluene and the catalyst was separated by a filtration and toluene was distilled off to obtain 39.8 wt. parts of 3,3-bis-(4-dimethylaminophenyl)-6-dimethylaminophthalide having a melting point of 180° to 183° C.

EXAMPLE 5

In accordance with the process of Example 4 except using cuprous acetate instead of the catalyst of Example 4, the oxidation and the post-treatment were carried out. As a result, 39.4 wt. parts of 3,3-bis-(4-dimethylaminophenyl)-6-dimethylaminophthalide having a melting point of 180° to 183° C. was obtained.

EXAMPLE 6

In accordance with the process of Example 1, the aqueous solution containing sodium carbonate and 2-[4,4'-bis-(dimethylamino)-benzhydryl]-5-dimethylaminobenzoic acid and cobalt complex of 1-[(2-hydroxy-5-nitrophenyl)azo]-2-hydroxynaphthalene-3,6-disulfonic acid, was heated at 90° C. and 1.6 wt. parts of oxygen was fed into it under the atmospheric pressure during 5 hours, and the precipitate was separated by a filtration and washed with a dilute aqueous solution of sodium hydroxide and with water to obtain 40.9 wt. parts of 3,3-bis-(4-dimethylaminophenyl)-6-dimethylaminophthalide having a melting point of 181° to 183° C.

EXAMPLE 7

In accordance with the process of Example 1, the aqueous solution containing a sodium carbonate and 2-[4,4'-bis-(dimethylamino)benzhydryl]-5-dimethylaminobenzoic acid and cobalt complex of 1-[(2-hydroxynaphthyl)azo]-2-hydroxybenzene-5-sulfonic acid [I], was heated at 90° C. and 36 wt. parts of air was fed into it under vigorously stirring during 15 hours and the precipitate was separated by a filtration and washed with a dilute aqueous solution of sodium hydroxide and with water to obtain 39.4 wt. parts of 3,3-bis-(4-dimethylaminophenyl)-6-dimethylaminophthalide having a melting point of 181° to 183° C.

We claim:

1. In a process for producing 3,3-bis-(4-dimethylaminophenyl)-6-dimethylaminophthalide which comprises oxidizing an alkali metal salt of 2-[4,4'-bis-(dimethylamino)-benzhydryl]-5-dimethylaminobenzoic acid in an aqueous solution at pH of 8 to 14 with hydrogen peroxide, oxygen or air the improvement wherein said reaction is carried out in the presence of a catalyst comprising a cobalt complex soluble in aqueous alkaline solution.

2. A process according to claim 1 wherein said cobalt complex is selected from the group consisting of cobalt complexes of 1-[(2-hydroxynaphthyl)azo]-2-hydroxybenzene-5-sulfonic acid;
1-[(2-hydroxy-5-nitrophenyl)azo]-2-hydroxynaphthalene-3,6-disulfonic acid;
1-[(1-phenyl-3-methyl-5-pyrazolone-4-yl)azo]-2-hydroxynaphthalene-4-sulfonic acid;
1-[(1-phenyl-3-methyl-5-pyrazolone-4-yl)azo]-2-hydroxynaphthalene-4-carboxylic acid;
2-hydroxy-3-[(N-phenyl-3-oxobutanamide-2-yl)azo]-5-nitro benzene sulfonic acid;
1,2-bis-(2-hydroxy-sulfobenzylidenamino)-benzene;
1,2-bis-(2-hydroxy-sulfobenzylidenamino)-ethane;
phenyl alanin sulfonic acid;
benzoylacetone sulfonic acid;
benzoyl-tri-fluoroacetone sulfonic acid;
1-formyl-2-hydroxybenzene sulfonic acid;
1-amino-2-hydroxybenzene sulfonic acid; or salts thereof.

3. A process according to claim 1 wherein said catalyst is added at a ratio of 0.001 to 5 wt.% based on the starting material.

4. A process according to claim 1 wherein hydrogen peroxide is added as an aqueous solution of hydrogen peroxide.

5. A process according to claim 1 wherein oxygen or air is gradually fed into said aqueous solution.

* * * * *